US008869667B2

(12) United States Patent
Deutsch et al.

(10) Patent No.: US 8,869,667 B2
(45) Date of Patent: Oct. 28, 2014

(54) SYSTEM, METHOD AND CORRESPONDING APPARATUS FOR SINGULATING A UNIT DOSE BLISTER CARD

(75) Inventors: David Deutsch, Cranberry Township, PA (US); Bruce Thompson, Pittsburgh, PA (US); David Monto, McKees Rocks, PA (US); Robert Jaynes, Pittsburgh, PA (US); William Meyer, Wexford, PA (US); Shawn T. Greyshock, Tarentum, PA (US)

(73) Assignee: Aesynt Incorporated, Cranberry, PA (US)

( * ) Notice: Subject to any disclaimer, the term of this patent is extended or adjusted under 35 U.S.C. 154(b) by 1127 days.

(21) Appl. No.: 12/631,189

(22) Filed: Dec. 4, 2009

(65) Prior Publication Data

US 2011/0132163 A1 Jun. 9, 2011

(51) Int. Cl.

| | |
|---|---|
| ***B26D 5/38*** | (2006.01) |
| ***B26D 7/02*** | (2006.01) |
| ***B26D 1/00*** | (2006.01) |
| ***B26D 9/00*** | (2006.01) |
| ***B26D 5/00*** | (2006.01) |
| ***B26D 7/01*** | (2006.01) |
| ***B26F 3/02*** | (2006.01) |
| ***B26F 3/00*** | (2006.01) |
| ***B26D 5/32*** | (2006.01) |
| *B26D 7/00* | (2006.01) |
| *B26F 1/00* | (2006.01) |
| *B26D 7/06* | (2006.01) |
| *B26D 1/08* | (2006.01) |

(52) U.S. Cl.

CPC ... *B26F 3/02* (2013.01); *B26D 9/00* (2013.01); *B26D 5/007* (2013.01); *B26D 7/01* (2013.01); *B26D 7/00* (2013.01); *B26F 1/00* (2013.01); *B26D 7/0633* (2013.01); *B26D 7/02* (2013.01); *B62D 5/40* (2013.01); *B26F 3/002* (2013.01); *B26D 5/32* (2013.01); *B26D 1/085* (2013.01)

USPC .................................. 83/371; 83/452; 83/697

(58) Field of Classification Search

CPC ........ B23D 59/003; B26D 1/08; B26D 5/007; B26D 5/32; B26D 5/34; B26D 5/42; B26D 7/015; B27B 31/06

USPC .................... 83/130, 370, 371, 373, 452, 697

See application file for complete search history.

(56) References Cited

U.S. PATENT DOCUMENTS

| | | | |
|---|---|---|---|
| 635,457 | A | 10/1899 | Yandall |
| 678,441 | A | 7/1901 | Stevens |

(Continued)

*Primary Examiner* — Kenneth E. Peterson
*Assistant Examiner* — Samuel A Davies
(74) *Attorney, Agent, or Firm* — Alston & Bird LLP

(57) ABSTRACT

An apparatus for singulating unit dose blisters from a blister card including at least two perforations separating unit dose blisters positioned adjacent to each other and extending along a longitudinal length of the blister card is provided. The apparatus may include a perforation determiner and a blister card cutter. The perforation determiner may be configured to generate information indicative of a distance between a first perforation location and a second perforation location of the blister card with respect to perforations extending along a direction substantially perpendicular to the longitudinal length of the blister card and separating unit dose blisters to be singulated. The blister card cutter may be configured to utilize the received information indicative of the distance and the total number of perforations to determine cutting locations for cutting at the first perforation location, the second perforation location and additional perforation locations and enable cutting of each perforation extending substantially perpendicular to the longitudinal length of the blister card responsive to sequential cutting and repositioning operations based on determined cutting locations.

19 Claims, 12 Drawing Sheets

(56) References Cited

U.S. PATENT DOCUMENTS 1,564,794 A 12/1925 Humphreys
2,270,473 A 1/1942 Porcelli
2,758,710 A 8/1956 Egmont
2,782,989 A 2/1957 Knox
3,160,048 A 12/1964 Barley
3,182,542 A 5/1965 Cochran
3,329,181 A 7/1967 Buss et al.
3,340,384 A 9/1967 Rosen et al.
3,656,391 A 4/1972 Von Arx
4,253,364 A * 3/1981 Kiefer et al. .................... 83/217
4,337,679 A 7/1982 Krylov et al.
4,679,473 A 7/1987 Hirata et al.
4,716,799 A * 1/1988 Hartmann ......................... 83/42
4,717,042 A 1/1988 McLaughlin
4,785,969 A 11/1988 McLaughlin
4,847,764 A 7/1989 Halvorson
4,932,301 A 6/1990 Buck
5,014,875 A 5/1991 McLaughlin et al.
5,048,816 A * 9/1991 Chun et al. .................... 271/227
5,131,301 A 7/1992 Gergek
5,190,185 A 3/1993 Blechl
5,314,243 A 5/1994 McDonald et al.
5,346,297 A 9/1994 Colson, Jr. et al.
5,346,456 A 9/1994 Rutledge et al.
5,377,572 A 1/1995 Sonobe et al.
5,377,864 A 1/1995 Blechl et al.
5,405,048 A 4/1995 Rogers et al.
5,431,299 A 7/1995 Brewer et al.
5,460,294 A 10/1995 Williams
5,468,110 A 11/1995 McDonald et al.
5,480,062 A 1/1996 Rogers et al.
5,520,450 A 5/1996 Colson, Jr. et al.
5,564,803 A 10/1996 McDonald et al.
5,593,267 A 1/1997 McDonald et al.
5,630,347 A 5/1997 Elvio
5,661,978 A 9/1997 Holmes et al.
D384,578 S 10/1997 Wangu et al.
5,713,485 A 2/1998 Liff et al.
5,716,114 A 2/1998 Holmes et al.
5,745,366 A 4/1998 Higham et al.
5,761,877 A 6/1998 Quandt
5,797,515 A 8/1998 Liff et al.
5,805,456 A 9/1998 Higham et al.
5,807,222 A 9/1998 Totani
5,842,976 A 12/1998 Williamson
5,878,885 A 3/1999 Wangu et al.
5,880,443 A 3/1999 McDonald et al.
5,883,806 A 3/1999 Meador et al.
5,893,697 A 4/1999 Zini et al.
5,905,653 A 5/1999 Higham et al.
5,912,818 A 6/1999 McGrady et al.
5,927,540 A 7/1999 Godlewski
5,940,306 A 8/1999 Gardner et al.
5,971,593 A 10/1999 McGrady
6,003,006 A 12/1999 Colella et al.
6,011,999 A 1/2000 Holmes
6,021,392 A 2/2000 Lester et al.
6,035,610 A * 3/2000 Vonderhorst et al. ........... 53/435
6,039,467 A 3/2000 Holmes
6,065,819 A 5/2000 Holmes et al.
6,068,156 A 5/2000 Liff et al.
6,109,774 A 8/2000 Holmes et al.
6,112,502 A 9/2000 Frederick et al.
6,116,461 A 9/2000 Broadfield et al.
6,151,536 A 11/2000 Arnold et al.
6,170,230 B1 1/2001 Chudy et al.
6,176,392 B1 1/2001 William et al.
6,189,727 B1 2/2001 Shoenfeld
6,223,934 B1 5/2001 Shoenfeld
6,256,967 B1 7/2001 Hebron et al.
6,283,322 B1 9/2001 Liff et al.
6,289,656 B1 9/2001 Wangu et al.
6,338,007 B1 1/2002 Broadfield et al.
6,339,732 B1 1/2002 Phoon et al.
6,361,263 B1 3/2002 Dewey et al.
6,370,841 B1 4/2002 Chudy et al.
6,449,927 B2 9/2002 Hebron et al.
6,471,089 B2 10/2002 Liff et al.
6,497,342 B2 12/2002 Zhang et al.
6,499,270 B2 12/2002 Peroni et al.
6,532,399 B2 3/2003 Mase
6,564,121 B1 5/2003 Wallace et al.
6,581,798 B2 6/2003 Liff et al.
6,609,047 B1 8/2003 Lipps
6,611,733 B1 8/2003 De La Huerga
6,625,952 B1 9/2003 Chudy et al.
6,640,159 B2 10/2003 Holmes et al.
6,650,964 B2 11/2003 Spano, Jr. et al.
6,671,579 B2 12/2003 Spano, Jr. et al.
6,681,149 B2 1/2004 William et al.
6,742,671 B2 6/2004 Hebron et al.
6,755,931 B2 6/2004 Vollm et al.
6,760,643 B2 7/2004 Lipps
6,776,304 B2 8/2004 Liff et al.
6,785,589 B2 8/2004 Eggenberger et al.
6,790,198 B1 9/2004 White et al.
6,793,424 B2 9/2004 Yamada et al.
6,814,254 B2 11/2004 Liff et al.
6,814,255 B2 11/2004 Liff et al.
6,847,861 B2 1/2005 Lunak et al.
6,874,684 B1 4/2005 Denenberg et al.
6,892,780 B2 5/2005 Vollm et al.
6,895,304 B2 5/2005 Spano, Jr. et al.
6,975,922 B2 12/2005 Duncan et al.
6,985,797 B2 1/2006 Spano, Jr. et al.
6,996,455 B2 2/2006 Eggenberger et al.
7,010,389 B2 3/2006 Lunak et al.
7,014,063 B2 3/2006 Shows et al.
7,016,766 B2 3/2006 William et al.
7,040,504 B2 5/2006 Broadfield et al.
7,052,097 B2 5/2006 Meek, Jr. et al.
7,072,737 B2 7/2006 Lunak et al.
7,072,855 B1 7/2006 Godlewski et al.
7,077,286 B2 7/2006 Shows et al.
7,085,621 B2 8/2006 Spano, Jr. et al.
7,092,796 B2 8/2006 Vanderveen
7,093,755 B2 8/2006 Jordan et al.
7,100,792 B2 9/2006 Hunter et al.
7,103,419 B2 9/2006 Engleson et al.
7,111,780 B2 9/2006 Broussard et al.
7,139,639 B2 11/2006 Broussard et al.
7,150,724 B2 12/2006 Morris et al.
7,171,277 B2 1/2007 Engleson et al.
7,182,007 B2 2/2007 Berge et al.
7,218,231 B2 5/2007 Higham
7,228,198 B2 6/2007 Vollm et al.
7,249,688 B2 7/2007 Hunter et al.
7,348,884 B2 3/2008 Higham
7,417,729 B2 8/2008 Greenwald
7,419,133 B2 9/2008 Clarke et al.
7,426,425 B2 9/2008 Meek, Jr. et al.
7,428,859 B2 9/2008 Fujita et al.
7,540,222 B2 6/2009 Kim
7,554,449 B2 6/2009 Higham
7,571,024 B2 8/2009 Duncan et al.
7,588,167 B2 9/2009 Hunter et al.
7,748,628 B2 7/2010 Greyshock
7,971,327 B2 7/2011 Deringor et al.
8,036,773 B2 10/2011 Braun et al.
2001/0049986 A1 12/2001 Roberts et al.
2006/0123969 A1 6/2006 Fujita et al.
2007/0261525 A1 11/2007 Yamaguchi et al.
2007/0265730 A1 11/2007 Greyshock

* cited by examiner

SYSTEM, METHOD AND CORRESPONDING APPARATUS FOR SINGULATING A UNIT DOSE BLISTER CARD

FIELD OF THE INVENTION

Exemplary embodiments of the present invention relate generally to automated singulation of units on a unit dose blister card.

BACKGROUND OF THE INVENTION

In a typical hospital, nursing home, or other similar institution, doctors will visit their patients on a routine basis and prescribe various medications for each patient. In turn, each patient will likely be placed on a certain medication treatment plan that requires that he or she take one or more doses of various medications daily. Some medications may require that they be administered only at certain times of the day (e.g., after meals) and/or at intervals of one or more hours each day. In addition, patients may request certain medications on an elective basis for complaints, such as head or body aches. These requests are typically included with the doctor's medication request or prescription that he or she sends to a pharmacy of the hospital for filling.

Medication requests or prescriptions received by the pharmacy will likely be checked by a registered pharmacist and then entered into the pharmacy information system. These requests reflect not only orders that are added to a particular patient's treatment plan, but also changes in a patient's existing treatment plan. The pharmacy information system combines this information with the patient's existing medication schedule and develops a patient medication profile. Using the patient medication profile, a fill list can be created that lists all medications that must be distributed to all patients for a given time period (e.g., a day).

In some instances, this list is printed and used by a pharmacist or pharmacy technician to hand pick each of the drugs needed for each patient (in the form of unit doses) and place those drugs in corresponding patient-specific medication containers (e.g., drawers, boxes, bins or bags). A registered pharmacist then checks the accuracy of the patient order, and, assuming the order was accurate, the individual patient boxes are loaded into a large transport cart and delivered to a nursing unit.

Several drawbacks exist, however, to this method of medication retrieval and distribution. In particular, it is very time consuming and manpower intensive. As a result, systems were created for automating the process of retrieving unit dose medications and distributing them to patients according to their respective medication profiles. One example of such a system is the ROBOT-Rx® system, offered by McKesson Automation Inc. and described in U.S. Pat. Nos. 5,468,110, 5,593,267 and 5,880,443, and other examples are described in U.S. patent application Ser. No. 11/382,605, filed May 10, 2006, Ser. No. 11/611,956, filed Dec. 18, 2006 and Ser. No. 11/755,207, filed May 30, 2007, the contents of which are hereby incorporated herein by reference.

The ROBOT-Rx® system, like other similar systems, is a stationary robotic system that automates the drug storing, dispensing, returning, restocking and crediting process by using barcode technology. In particular, single doses of medications are re-packaged, for example in a clear plastic bag, so that each package contains a barcode corresponding to the package contents. The barcode may include the name of the medication, quantity, weight, instructions for use and/or expiration date.

The packaged medications are then stored in a storage area, such as a storage rack having a frame and a plurality of rod supports on which each package can be hung in a manner that provides each with an X, Y coordinate. Using the X, Y coordinates, packages can then be selected by an automated picking means (e.g., a robotic arm capable of moving at least in three, mutually orthogonal directions designated X, Y and Z), for distribution to individual patients.

More specifically, in one instance, a pharmacist or technician may manually enter the identification of a specific medication he or she would like the automated system to retrieve, for example, as a patient's first dose, in an emergency situation. The automated system, and, in particular, a computer associated with the automated system, would then locate the desired medication (i.e., the X, Y and Z coordinates of the medication) and instruct the picking means to retrieve the medication at that location. In another instance, the fill list created based on each patient's medication profile may be communicated to the computer associated with the automated system, providing the automated system with a current list of all patients and their individual medication needs. The computer also maintains a database of all medications stored in the storage area along with their corresponding X, Y and Z coordinates.

Patient-specific containers (e.g., drawers or bins) displaying barcodes that include the corresponding patient's unique identification code are placed on a conveyer belt associated with the automated system. At one point on the belt, a barcode reader reads the barcode displayed on the patient-specific box or container and communicates the patient's identification to the computer. The computer will then retrieve the patient's medication needs from the fill list, and determine the corresponding coordinates for each medication by accessing the database.

The computer can then guide the picking means to select the desired unit dose medications and deposit them in the patient-specific boxes or containers. In particular, the picking means, which also includes a barcode reader, moves to the designated location of a particular medication, as instructed by the computer, scans the barcode displayed on the package containing the medication to identify the medication contained in the package, and provides the identity to the computer.

After the computer confirms that the correct unit dose medication is contained in the package, the picking means will remove the package from the storage area (e.g., using a vacuum generator to produce suction to pull the package off the rod, or other holding means, and hold the package until it can be deposited) and drop it into the patient-specific container.

The process is repeated until the patient's prescription has been filled (i.e., until the patient-specific medication container contains each dose of medication to be taken by the patient in the given time period or, in the instance where the unit dose retrieved the first dose for a new patient, until that first dose has been retrieved). The conveyor belt then moves the patient-specific container to a check station where an operator can use yet another barcode reader to scan the barcode label on the patient-specific container to retrieve and display the patient's prescription, as well as to scan the barcodes on each package in the container to verify that the medications are correct.

As described above, unit dose medications dispensed robotically may be packaged into bags, boxes or a variety of other over-wraps prior to being stored in the storage area. This repackaging effort is performed for several reasons. First, the size and shape of the raw packages vary greatly; therefore, without some commonality in product shape, robotic handling becomes extremely difficult. Second, while robotic systems typically rely on barcodes to identify the products throughout the process, the majority of products originating from various manufacturers do not contain barcodes of any kind or are inconsistent with respect to the information they provide. Accordingly, in these instances, over-wrapping the unit dose with a package containing a barcode may be accomplished for identification purposes.

More recently, efforts have been made to reduce any need for repackaging since, for example, repackaging adds material costs to the final product and requires both additional technician time to perform the packaging as well as additional pharmacist time to validate the content of the package against the description on the label. In addition, repacking by a hospital, or similar institution, shortens the expiration date of the repackaged item based on United States Pharmacopeia/National Formulary (USP/NF) repackaging standards. Moreover, since efforts are being made to ensure that all human drug products have a barcode on the smallest container or package distributed which, in many instances, is the unit dose medication, each unit dose on a unit dose blister card will have a barcode thereon. This includes all human prescription drug products and over-the-counter drugs that are dispensed pursuant to an order in the hospital. The barcode must contain, at a minimum, a National Drug Code (NDC) in a linear barcode, in the Uniform Code Council (UCC) or Health Industry Business Communications Council (HIBCC) format. Following the effective date of this mandate, assuming that the unit dose medications are the smallest container or package used, all unit dose medications will contain barcodes that can be used by robotic dispensing systems, thus eliminating the need to overwrap or repackage merely for identification purposes.

However, even though improvements may be achieved by enhancing the utility of an automated dispensing system in relation to eliminating repackaging or over-wrapping operations, such systems still require a fair amount of manual intervention to prepare the medications for automated dispensing. Additionally, there is no standard shape or configuration for unit dose blister cards, so automatic dispensing of unit doses was a challenge. This challenge was initially met by U.S. patent application Ser. No. 11/382,605, filed May 10, 2006, which provided a robotic device capable of dispensing unit dose blisters automatically. However, a requirement still remained for each of the unit dose blisters to be singulated manually. For example, a technician must typically undertake the tedious task of manual separation of each single unit dose blister for singulation and placement of such unit dose blisters, oriented bar code up, into a dedicated tray cavity. In some cases, technicians may be required to singulate up to three to four thousand doses per day (or more). Accordingly, it may be desirable to provide a mechanism by which to automatically singulate unit doses on a blister card.

BRIEF SUMMARY OF THE INVENTION

In general, exemplary embodiments of the present invention provide improvements relating to, among other things, providing a mechanism by which to singulate individual unit doses of a blister card. In particular, embodiments of the present invention may enable a determination or at least an accurate estimation of the location of perforations between unit dose blisters on a blister card. The blister card may then be reliably and automatically cut so that each unit dose blister is singulated without increasing the risk of penetrating the seal on any of the unit dose blisters.

In particular, according to one aspect of the present invention, an apparatus for singulating unit dose blisters from a blister card including at least two perforations separating unit dose blisters positioned adjacent to each other and extending along a longitudinal length of the blister card is provided. The apparatus may include a perforation determiner and a blister card cutter. The perforation determiner may be configured to generate information indicative of a distance between a first perforation location and a second perforation location of the blister card with respect to perforations extending along a direction substantially perpendicular to the longitudinal length of the blister card and separating unit dose blisters to be singulated. The blister card cutter may be configured to utilize the received information indicative of the distance and the total number of perforations to determine cutting locations for cutting at the first perforation location, the second perforation location and additional perforation locations and enable cutting of each perforation extending substantially perpendicular to the longitudinal length of the blister card responsive to sequential cutting and repositioning operations based on determined cutting locations.

In another exemplary embodiment, a method of singulating unit dose blisters from a blister card including at least two perforations separating unit dose blisters positioned adjacent to each other and extending along a longitudinal length of the blister card is provided. The method may include receiving information indicative of a distance between a first perforation location and a second perforation location of the blister card for perforations extending along a direction substantially perpendicular to the longitudinal length of the blister card and separating unit dose blisters to be singulated. The method may further include utilizing the received information to determine cutting locations for cutting at the first perforation location, the second perforation location and additional perforation locations, and enabling cutting of each perforation extending substantially perpendicular to the longitudinal length of the blister card responsive to sequential cutting and repositioning operations based on determined cutting locations.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 7A:
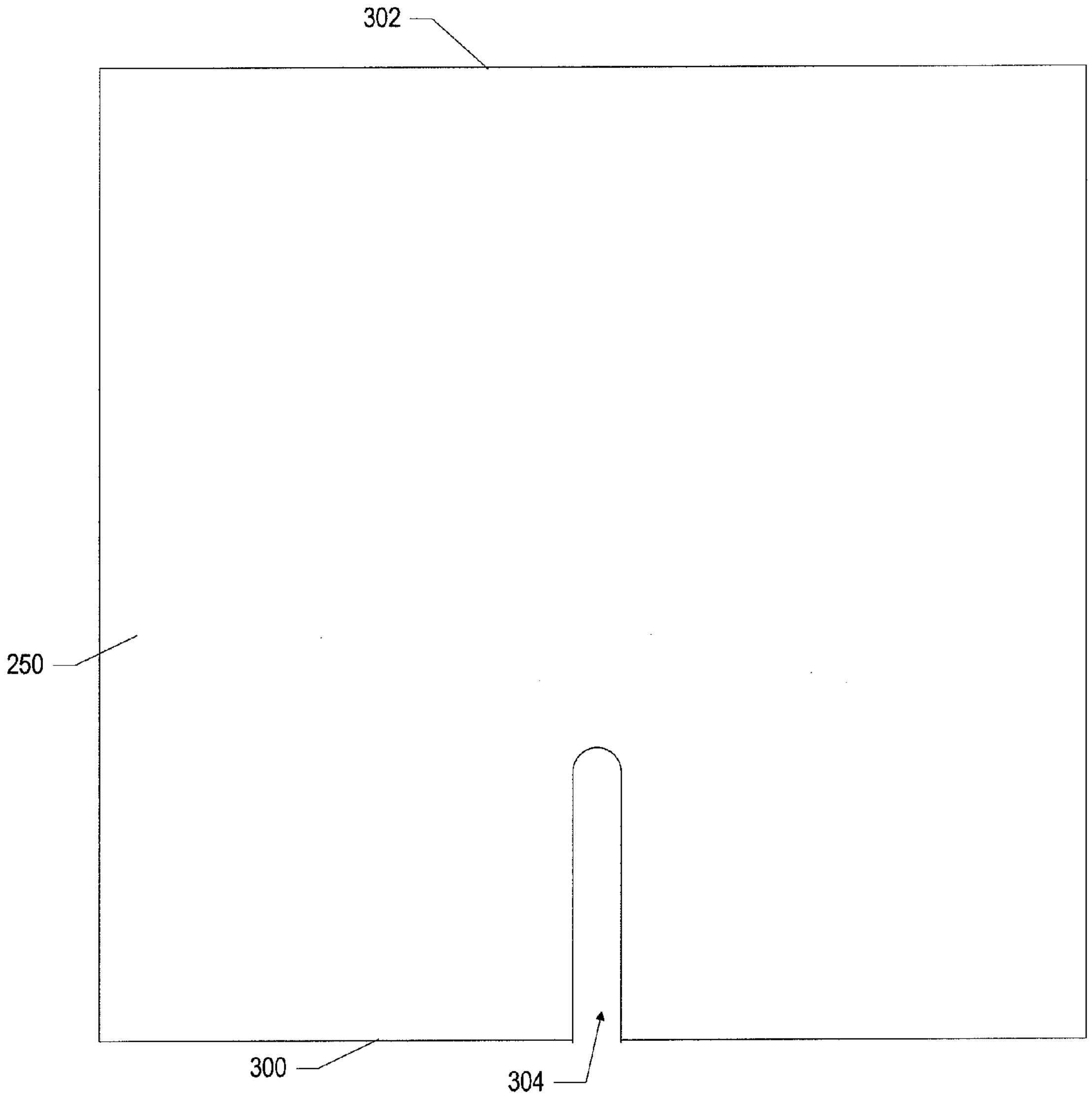
Figure 7B:
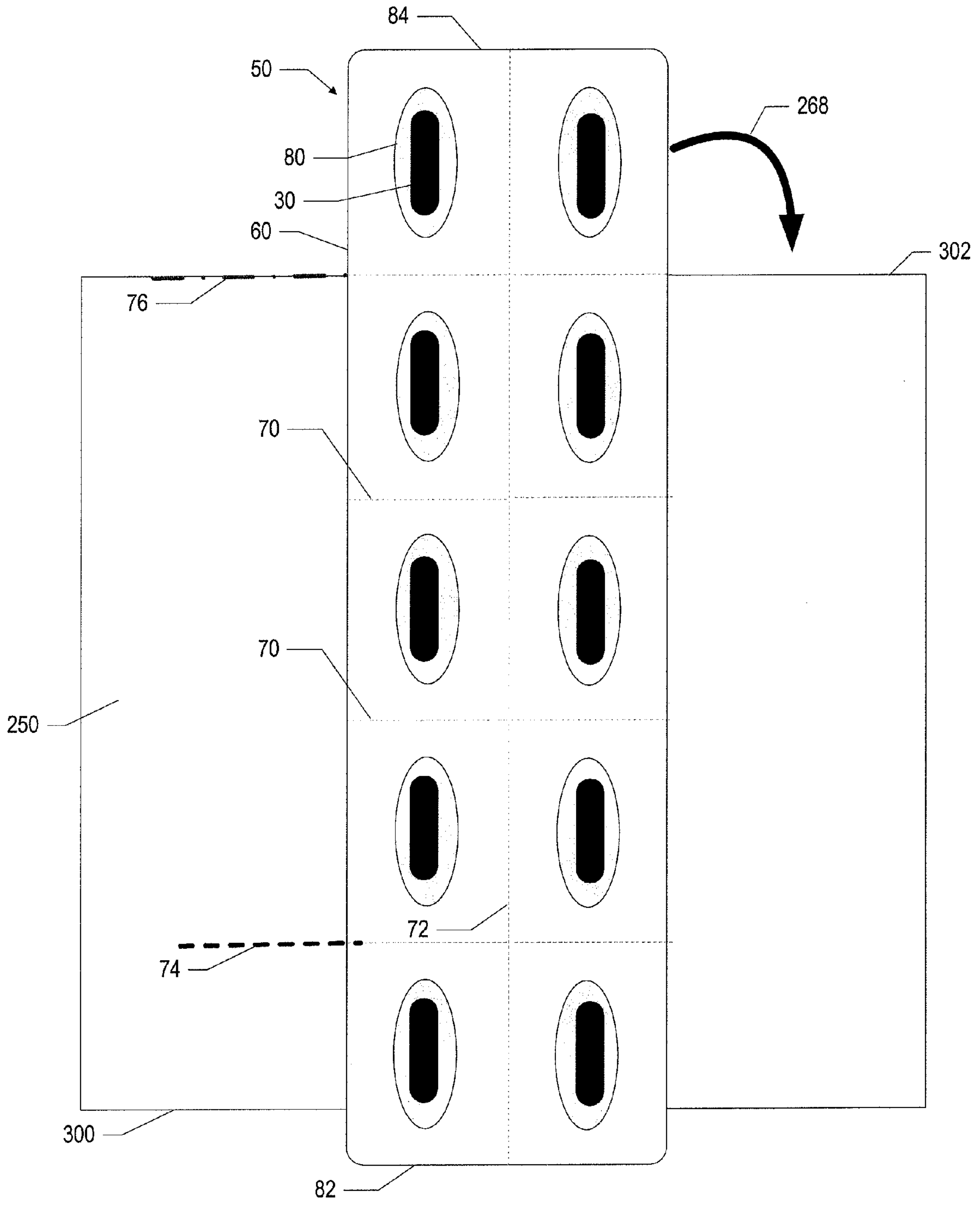
Figure 7C:
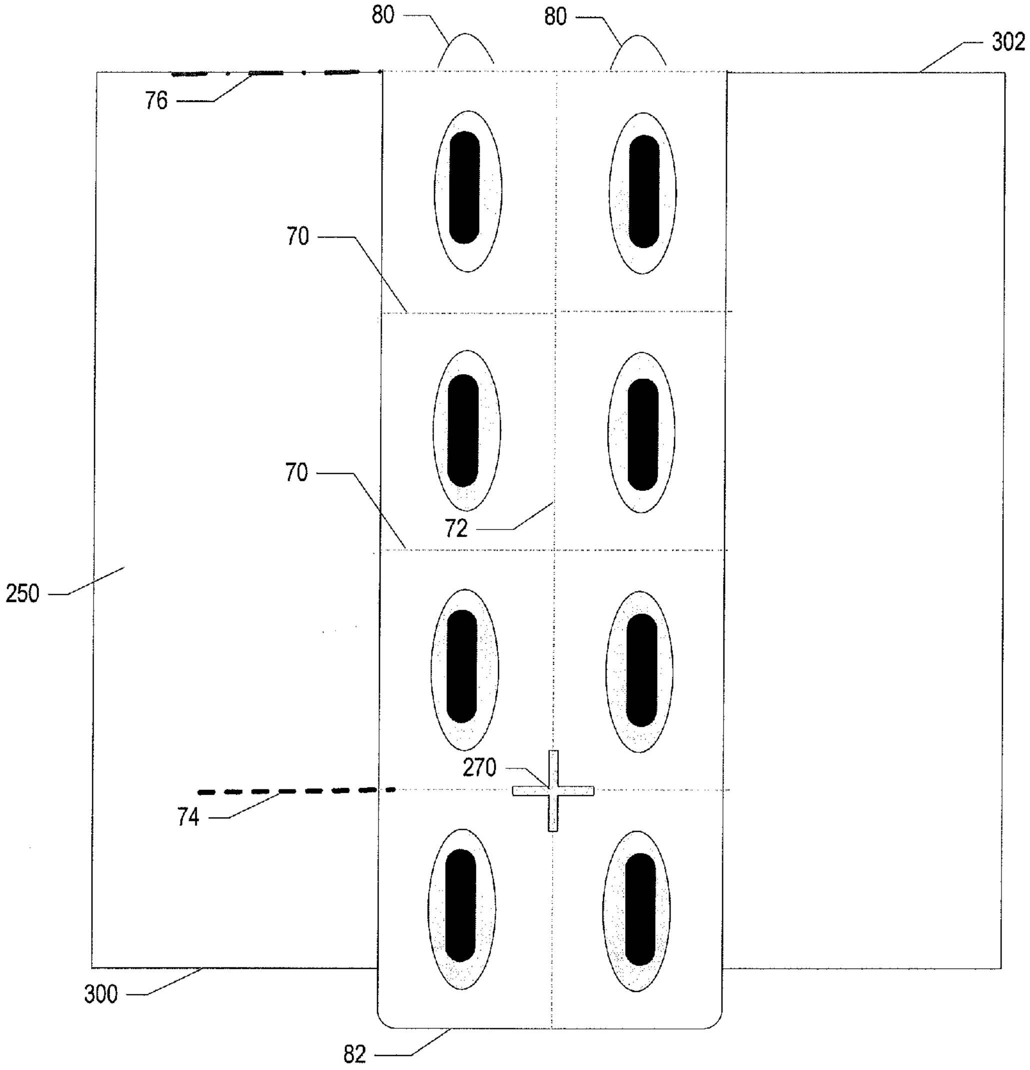
Figure 8:
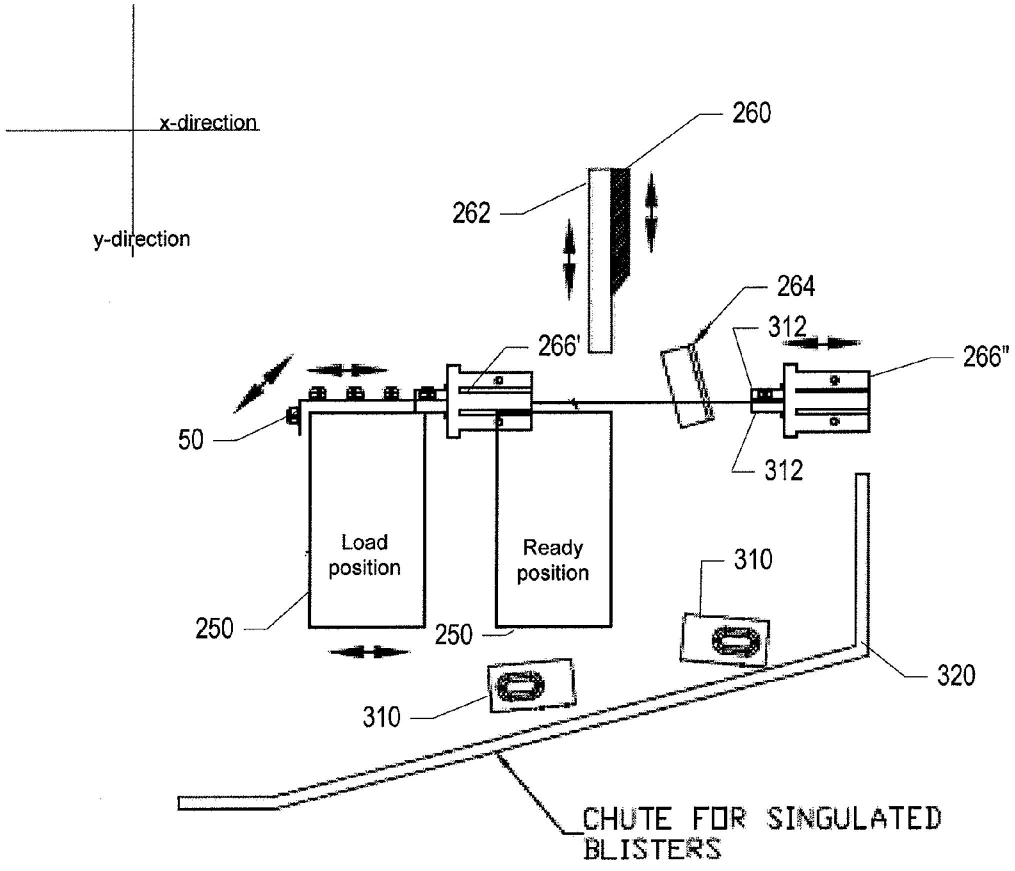
Figure 9:
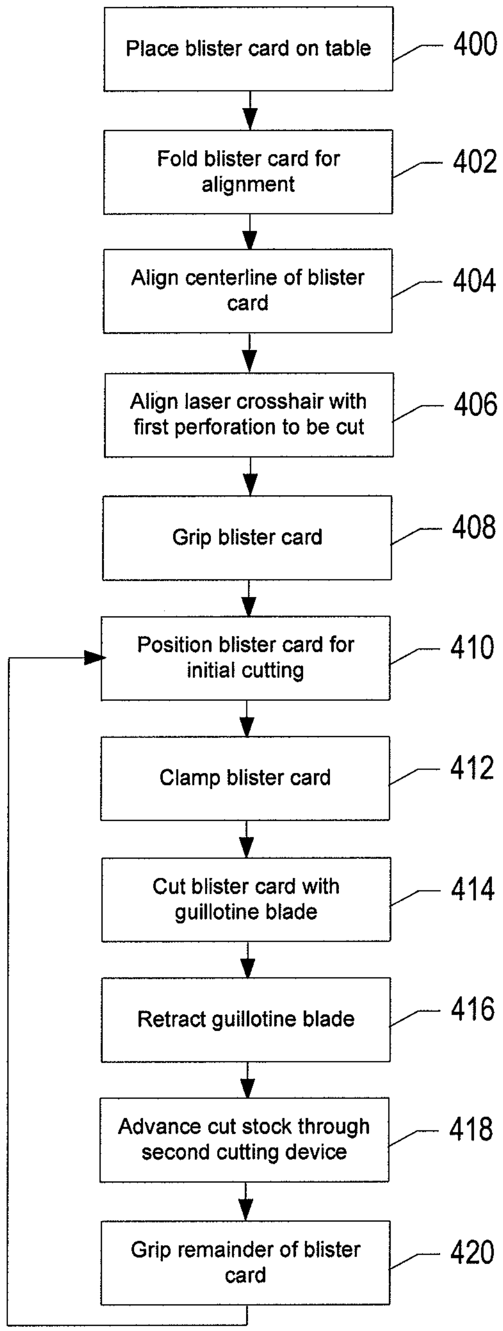
Figure 10:
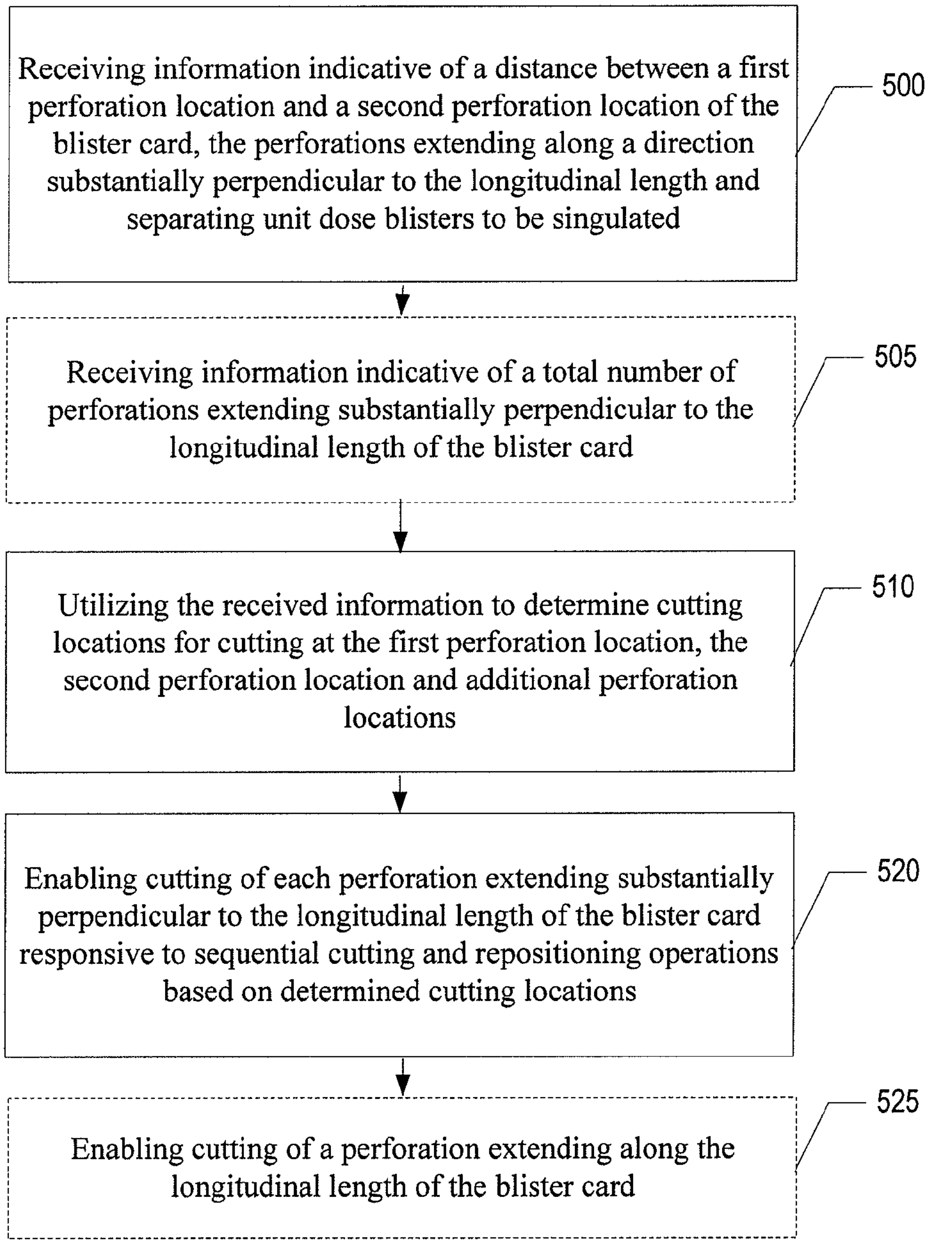

FIG. 7, which includes FIGS. 7A, 7B and 7C, shows operation of a perforation determiner according to an exemplary embodiment of the present invention;

FIG. 8 illustrates a side view of some components of a blister singulator according to an exemplary embodiment of the present invention;

FIG. 9 illustrates a block diagram showing operations associated with operation of one example embodiment of the blister singulator; and FIG. 10 is a flow chart illustrating a method for singulating a unit dose blister card in accordance with an exemplary embodiment of the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In general, exemplary embodiments of the present invention provide a mechanism by which unit dose blisters may be separated either automatically or with minimal manual assistance. Moreover, embodiments of the present invention may provide a mechanism by which to accurately and reliably cut along the perforations that separate each unit dose blister. As such, the location of the perforations may be detected on a blister card or at least estimated with accuracy. Thereafter, a cutting device may be employed to cut along the perforations in order to singulate the unit dose blisters. In some cases, by detecting and thereafter cutting based on the detected perforations, singulation may be accomplished with respect to unit dose blisters on blister cards having various different shapes and/or configurations in a manner that reduces the likelihood of cutting into the seal around each unit dose blister or the barcode or human readable text that identifies the medication in the unit dose blister. For example, the blister card itself may experience alignment irregularities that place the perforations (and therefore also the sealed portions of each unit dose blister on the blister card) in positions that are not consistent relative to the edges of the blister cards when compared to other blister cards among a plurality of blister cards for different or even in some cases the same type of product. Thus, embodiments of the present invention may provide a mechanism for singulating and thereafter handling unit dose packages in their natural, raw state in a repeatable fashion so that they can be selectively retrieved and delivered, for example by one of the automatic retrieval systems discussed above (e.g., the ROBOT-Rx® system or a robot system able to handle blister dispensing such as that described in U.S. patent application Ser. No. 11/382,605, filed May 10, 2006).

Figure 1:
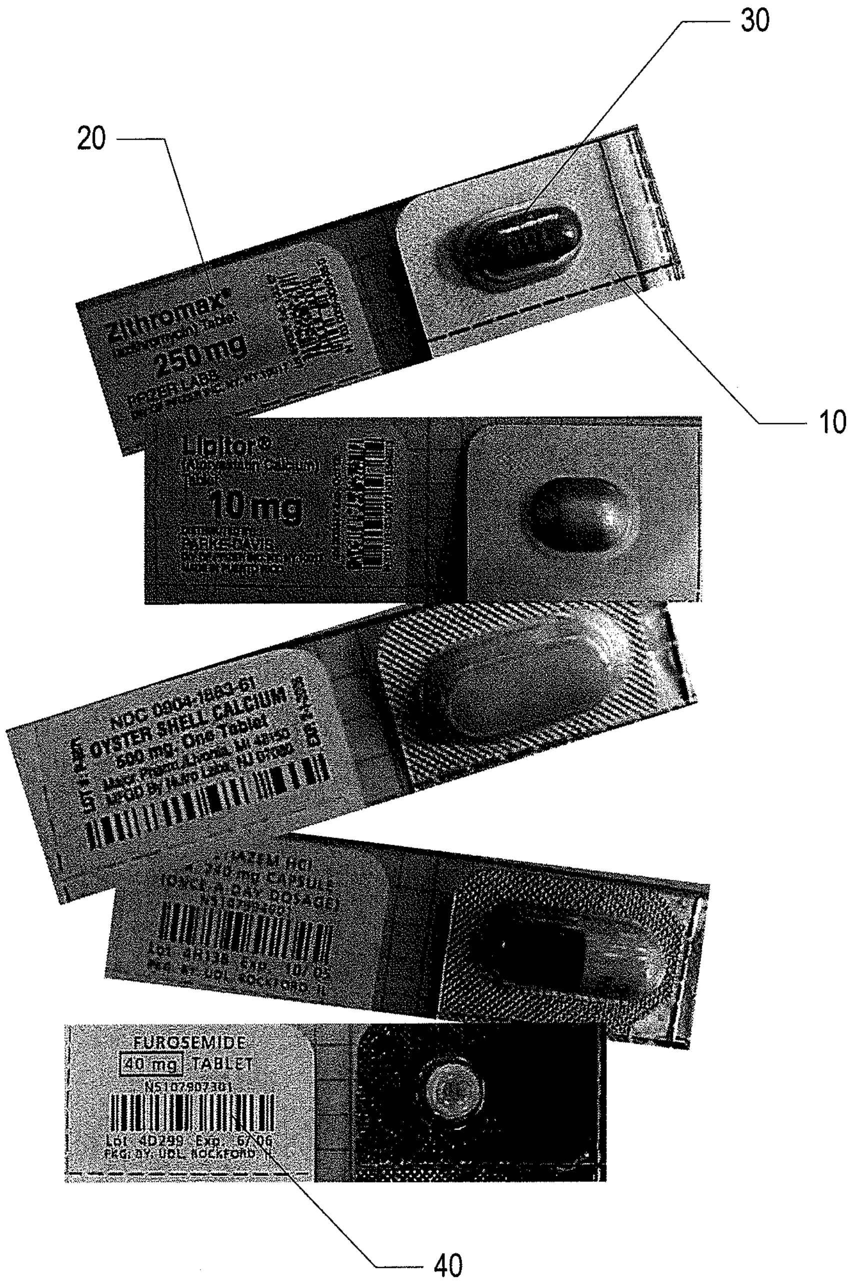
FIG. 1 illustrates several unit dose blisters.

The term "unit dose blister" refers to a unit dose medication, or one or more oral solids of the same or different strength, form or type, that has been sealed in a package, such as a vinyl and foil package in which the vinyl conforms to the shape of the medication. The vinyl is typically sealed to a foil that offers a flat surface with medication information printed on the opposite side from the vinyl cavity. FIG. 1 illustrates several examples of unit dose blisters. As shown, the unit dose blister may include a support panel having opposed first 10 and second 20 sides, wherein the unit dose medication 30 (i.e., the one or more oral solids) is positioned proximate the first side 10 of the support panel, and an identification code 40 (e.g., a barcode, radio frequency identification (RFID) tag, or simple text including any number and combination of alphanumeric characters) including information identifying the unit dose medication 30 is displayed on the second side 20 of the support panel.

Figure 2:
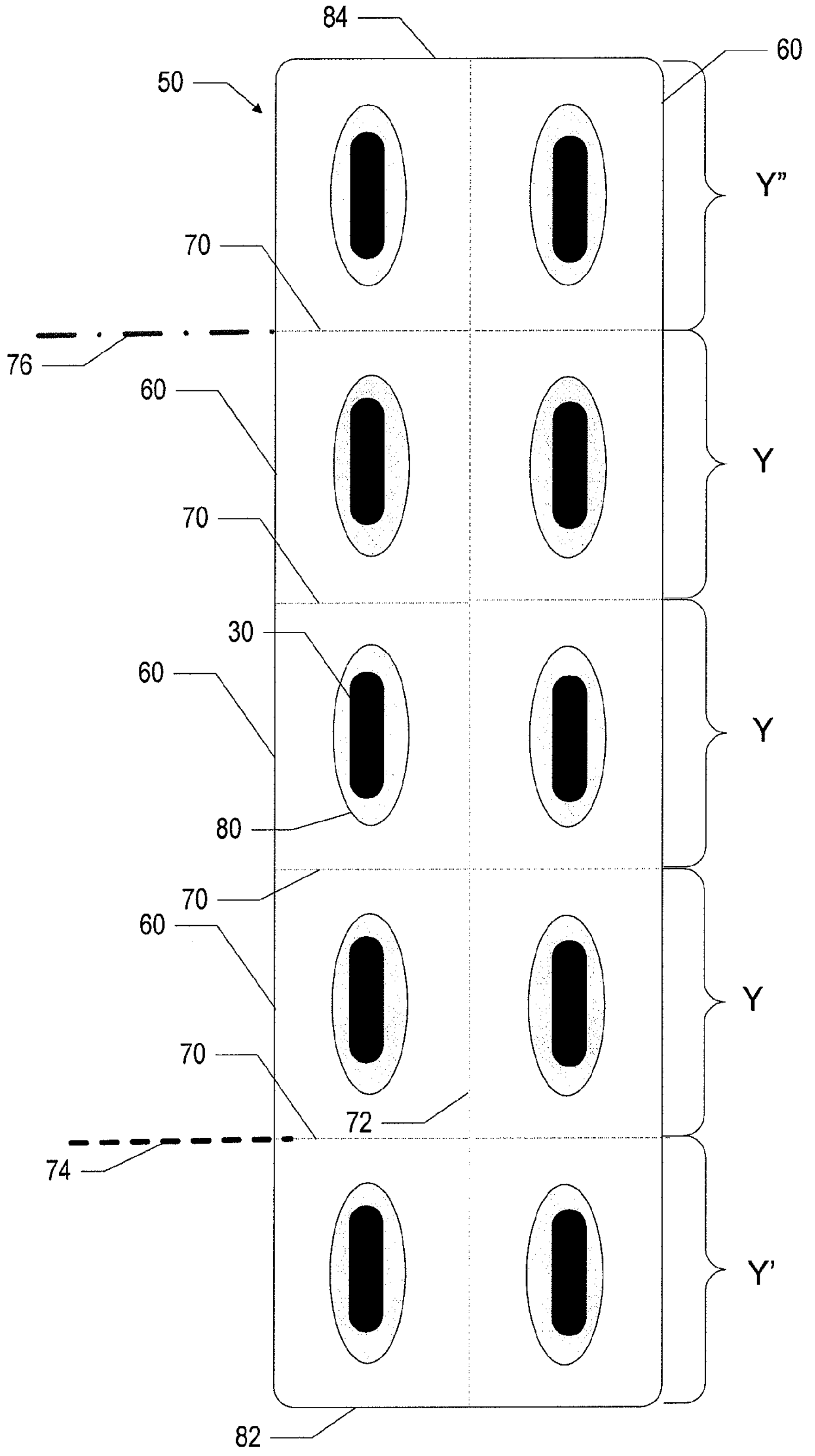
FIG. 2 illustrates several unit dose blisters within a blister card.

When unit dose medications are packaged into a blister, they are typically packaged with several medications per blister card. Thus, there are a corresponding number of equally-spaced vinyl formed cavities per blister card. These cavities are typically separated by a perforation. During formation of a blister card, several manufacturing stations are encountered, but there is no correlation between the handling techniques employed at each station. Accordingly, a blister card that passes through a station for forming a cavity, labeling of the blister, punching of the blister receptacle, punching out of the card, etc., may not be handled in the same manner at each station as the previous or subsequent blister card. Accordingly, inconsistencies may be created between different blister cards. A singulated blister is one that has been separated from a blister card typically along its perforation. FIG. 2 illustrates a diagram of a blister card 50 according to an exemplary embodiment. As shown in FIG. 2, the blister card 50 may include a plurality of unit dose blisters 60 separated by perforations 70 and 72. The perforations 70 may extend between each adjacent unit dose blister 60 in substantially a straight line from one end of the blister card 50 to an opposite end of the blister card 50 in both horizontal and vertical directions. As such, one set of perforations (e.g., extending in a substantially horizontal direction) may be intersected by another set of perforations (e.g., extending in a substantially vertical direction) at approximately a right angle. Each unit dose blister 60 may include one unit dose medication 30 disposed in a vinyl cavity 80. The vinyl cavity 80 of each unit dose blister 60 may be approximately centrally located with respect to edges of the corresponding unit dose blister 60 as defined by the perforations 70 and/or blister card 50 edges that are immediately adjacent to the corresponding unit dose blister 60.

As indicated above, the distance from the vinyl cavity 80 to the edge of the blister card 50 may vary from card to card. However, the distance between perforations 70 is consistent within a given blister card. Thus, it may be expected that a distance between perforations 70 is relatively constant along a given direction. However, a distance between a perforation and an edge of the blister card 50 (e.g., edges 82 and 84) may not be the same as the distance between perforations. Thus, for example, as shown in FIG. 2, a vertical distance between each perforation may be distance Y. However, a vertical distance between a first edge of the blister card 50 and a first perforation encountered when extending across the blister card 50 in the vertical direction (e.g., distance Y') may not necessarily be equal to distance Y. Additionally, a vertical distance between a second edge of the blister card 50 and a first perforation encountered when extending across the blister card 50 in the vertical direction (e.g., distance Y") may not necessarily be equal to distance Y (or Y').

FIG. 2 shows a common 2×5 arrangement for the blister card 50 having only one perforation roughly approximating the centerline of the longitudinal axis of the blister card 50 (e.g., a centerline perforation 72). However, for embodiments with more than two unit dose blisters in the horizontal direction, the horizontal distances between the perforations would be expected to be the same, while the distance between the last perforation on each of the right and left sides of the blister card and the corresponding right and left edges of the blister card may not be the same.

The blister card 50 may include a first edge 82 and a second edge 84, respectively, positioned at opposite longitudinal ends of the blister card 50. Although embodiments of the present invention could be practiced with either the first edge 82 or the second edge 84 being the leading edge in terms of entry into the cutting device to be described herein, the first edge 82 will be designated herein as the leading edge (e.g., first edge into the cutting device) for purposes of consistency and simplicity of description. Based on the first edge 82 being the first edge into the cutting device, a first perforation location 74 would then be defined as the location of the perforation 70 that is closest to the first edge 82. Correspondingly, a second perforation location 76 may then be defined as the location of the perforation 70 that is closest to the second edge 84. As will be described in greater detail below, embodiments of the present invention may provide for measurement or determination of the position of the perforations 70 so that precision cuts may be made along the perforations 70. It should be noted that the second perforation 76 may alternatively be referred to herein as a last perforation since, although in a specific example described herein, the second perforation location happens also to be the last perforation location on the blister card, in some cases, the first and second perforation locations could merely be adjacent perforations regardless of whether such perforations correspond to perforations closest to either end of the blister card.

As one of ordinary skill in the art will recognize, while reference is made throughout to unit dose blisters of the form described above, these unit dose blisters provide just one form in which unit dose medications may be packaged. Use of unit dose blisters in the description of exemplary embodiments included herein should not, therefore, be taken as limiting the scope of the present invention to use with such unit dose packages. In contrast, other unit dose packages may similarly be used in connection with exemplary embodiments without departing from the spirit and scope of the present invention. Furthermore, it should be noted that although the blister card 50 of FIG. 2 shows a 2×5 unit dose configuration, other configurations are also possible including a 2×10 configuration, configurations with more than two in the horizontal direction (e.g., a 4×4 configuration), and any other configuration.

Figure 3:
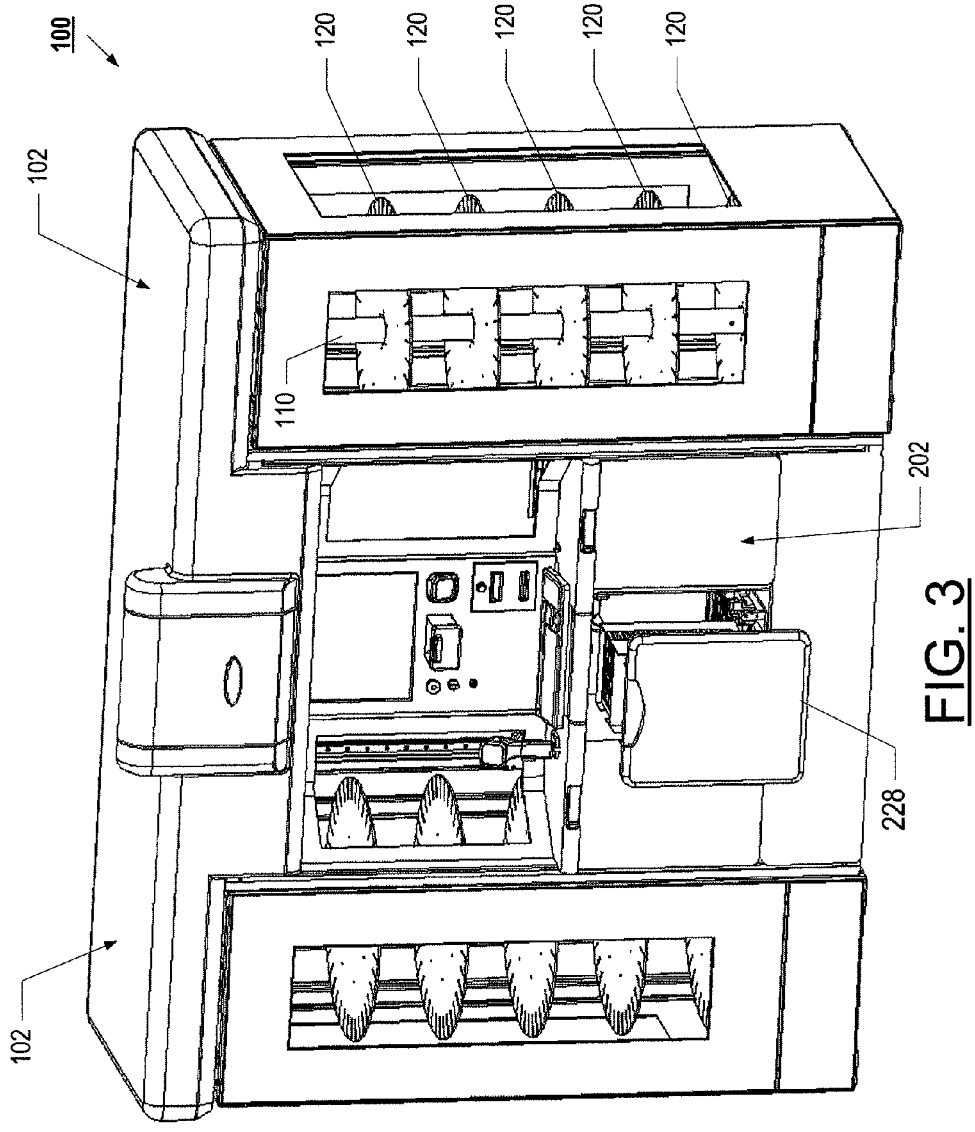
FIGS. 3 and 4 illustrate a storage, retrieval and delivery system in accordance with exemplary embodiments of the present invention.
Figure 4:
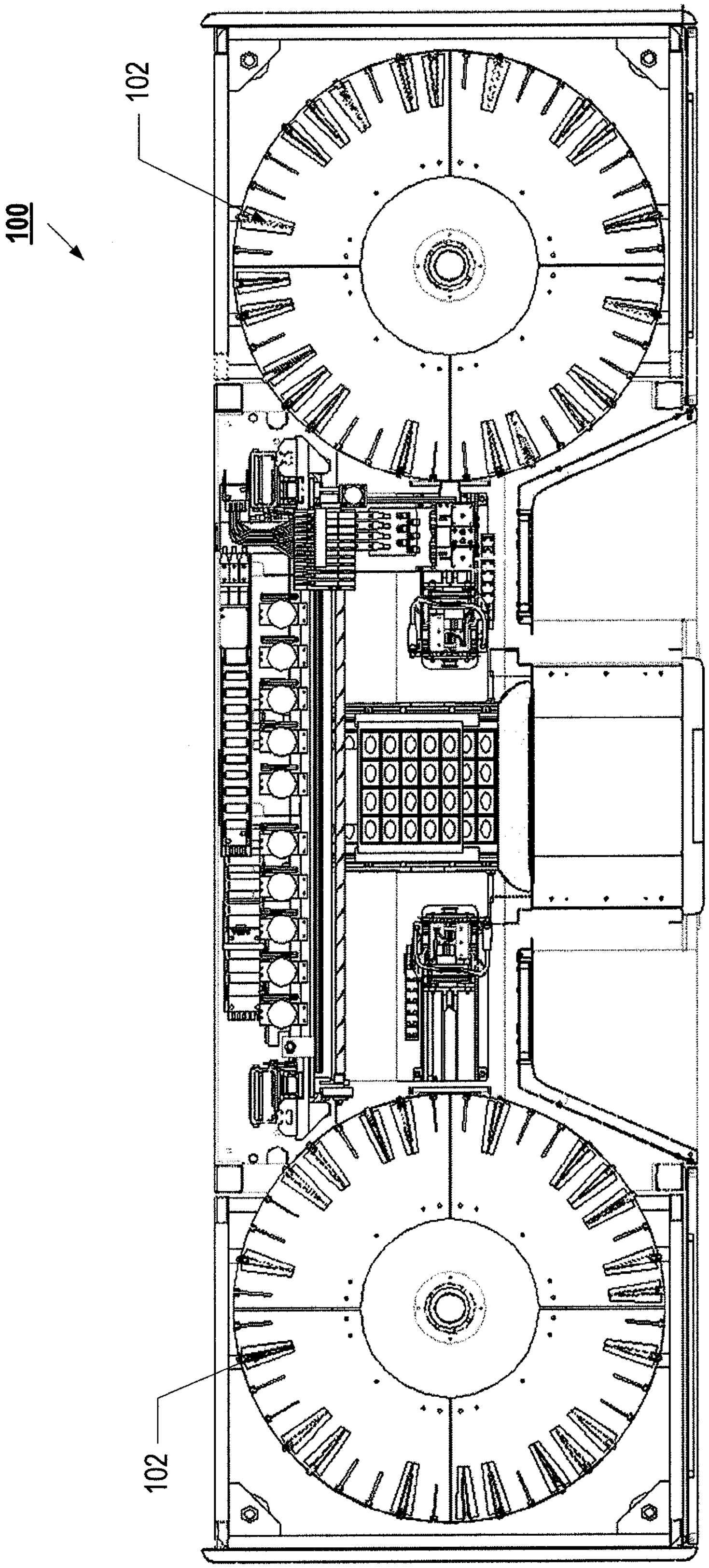

Reference is now made to FIGS. 3 and 4, which illustrate one example of a storage, retrieval and dispensing system 100, in which exemplary embodiments of the present invention may be implemented. As one of ordinary skill in the art will recognize, the system 100 illustrated and described herein is just one manner in which the unit dose packages, or packages containing unit dose medications (e.g., unit dose blisters) may be handled in their natural or raw state (i.e. not over-wrapped or repackaged) in accordance with exemplary embodiments of the present invention. The system 100 of FIGS. 3 and 4 is provided for exemplary purposes only and should not be taken as limiting the scope of the invention in any way, since other systems may likewise be implemented without departing from the spirit and scope of the present invention.

Figure 5:
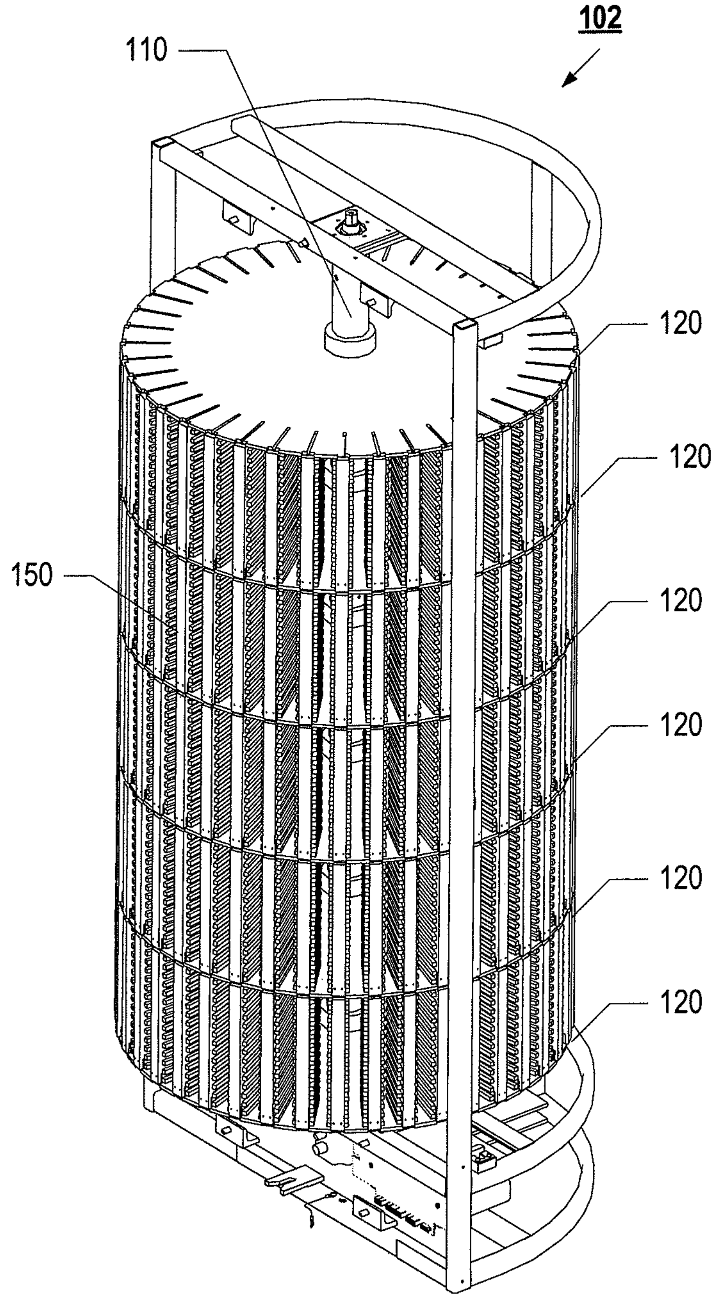
FIG. 5 illustrates a storage system in accordance with exemplary embodiments of the present invention.

The system 100 of exemplary embodiments may include a means for storing a plurality of unit dose blisters of various shapes and sizes, referred to herein as a "storage system" 102. As shown, the storage system 102 of one exemplary embodiment, which is also illustrated in FIG. 5, may be in the form of one or more carousels capable of rotating around a rod or pole 110 extending upward through the center of the carousel. While not shown, the storage system may, alternatively, comprise a linear track that is stationary and essentially resembles a plurality of pigeon holes or mail slots each including a unit dose package mount (e.g., a unit dose blister mount), which is described in detail below. Returning to FIGS. 3 and 4, the rod or pole 110 may be configured to support a plurality of circular panels 120 positioned at some distance from one another, wherein each panel is, in turn, configured to support a plurality of unit dose package mounts (e.g., unit dose blister mounts) (not shown in FIG. 3 or 5), via a plurality of package mount receptacles 150 (e.g., blister mount receptacles—shown in FIG. 5).

In this regard, the blister mount receptacles 150 of one embodiment shown in FIG. 5 extend between adjacent panels 120 so as to define a plurality of wedge-shaped cavities. While the panels 120 could be spaced and the unit dose blister mounts sized such that each wedge-shaped cavity defined by the blister mount receptacles 150 received a single unit dose blister mount, the storage system 102 of the illustrated embodiment is capable of storing a plurality of unit dose blister mounts within each wedge-shaped cavity. In this regard, the blister mount receptacles 150 can include tracks for engaging corresponding grooves or other features defined by the unit dose blister mounts such that multiple unit dose blister mounts can be inserted into a single storage location, e.g., a single wedge-shaped cavity, in an organized manner.

Figure 6:
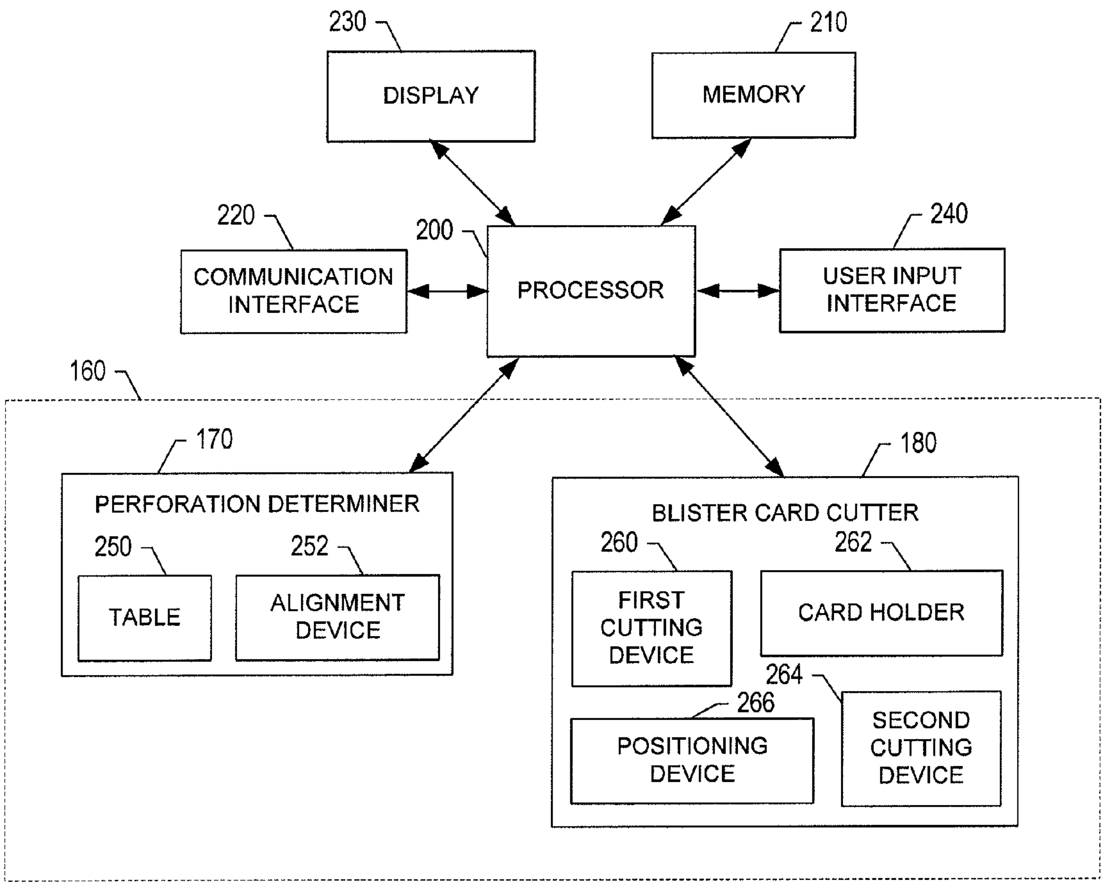
FIG. 6 illustrates a block diagram of a blister singulator according to an exemplary embodiment of the present invention.

In an exemplary embodiment, the system of FIGS. 3-5 may further include or otherwise be in operable communication with a unit dose blister singulator, an exemplary embodiment of which is shown in FIG. 6. FIG. 6 illustrates a block diagram of a blister singulator 160 according to an exemplary embodiment. The blister singulator 160 according to one exemplary embodiment may be a device comprising mechanical and electrical components configured to enable the blister singulator 160 to determine locations of perforations on a blister card and cut the blister card based on the identified locations in order to singulate individual unit dose blisters.

As shown in FIG. 6, the blister singulator 160 of an exemplary embodiment may include a perforation determiner 170 and a blister card cutter 180. The perforation detector 170 and the blister card cutter 180 may each be any means or combination of means such as a device or circuitry (or combination thereof) embodied in either hardware, computer program product, or a combination of hardware and computer program product that is configured to perform the corresponding functions of the perforation determiner 170 and the blister card cutter 180, respectively, as described herein.

In an exemplary embodiment, one or both of the perforation determiner 170 and the blister card cutter 180 may include or otherwise operate under the control of processing circuitry. Moreover, in some embodiments the processing circuitry of FIG. 6 may also control the storage, retrieval and delivery system 100 of exemplary embodiments of the present invention. As such, the system 100 may further comprise a processor, controller, or similar processing device, capable of directing the perforation determiner 170 and the blister card cutter 180 as described herein. However, in alternative embodiments, the processing circuitry may only control the operation of the blister singulator 160.

An exemplary embodiment will now be described referring to FIG. 6, which is a block diagram of a controller, or similar processing device, capable of operating in accordance with an exemplary embodiment of the present invention. As shown, the processing circuitry may include various means for performing one or more functions in accordance with exemplary embodiments of the present invention, including those more particularly shown and described herein. It should be understood, however, that the processing circuitry, which may include a controller, or similar processing device, may include alternative means for performing one or more like functions, without departing from the spirit and scope of the present invention. As shown, the processing circuitry may include a processor 200 connected to a memory 210. In addition to the memory 210, the processor 200 may also be connected to at least one interface or other means for displaying, transmitting and/or receiving data, content or the like. In this regard, the interface(s) can include at least one communication interface 220 or other means for transmitting and/or receiving data, content or the like, as well as at least one user interface that may include a display 230 and/or a user input interface 240. The user input interface 240, in turn, may comprise any of a number of devices allowing the controller to receive data from a user, such as a keypad, a touch display, a joystick, a foot pedal, actuator, button or other input device. However, in some embodiments, the display 230, user input interface 240 and/or the communication interface 220 may be omitted.

The processor 200 may be embodied as various processing means such as a processing element, a coprocessor, a controller or various other processing devices including integrated circuits such as, for example, an ASIC (application specific integrated circuit), an FPGA (field programmable gate array), a PLC (programmable logic controller), a hardware accelerator, or the like. The processor 200 may be configured (e.g., via hardcoded instructions or via execution of software instructions) to perform or control the various functions of the processing circuitry. The memory 210 may include volatile and/or non-volatile memory, and typically stores content, data or the like. For example, the memory 210 may store content transmitted from, and/or received by, the processing circuitry. Also for example, the memory 210 may store software applications, instructions or the like for enabling the processor 200 to perform steps associated with operation of the processing circuitry in accordance with embodiments of the present invention.

In one exemplary embodiment, the memory 210 stores instructions for directing the processor 200 to control the perforation determiner 170 in relation to determining perforation locations for the blister card 50. In some cases, only the first perforation location 74 and the second perforation location 76 may need to be accurately determined and the locations of the other perforations 70 may be determined accurately based on the first and second perforations locations 74 and 76. In an exemplary embodiment, in order to determine the first perforation location 74 and the second perforation location 76, the perforation determiner 170 may include a table 250 and an alignment device 252. Meanwhile, in order to singulate each unit dose blister 60 of the blister card 50, the blister card cutter 180 may include a first cutting device 260, a card holder 262, a second cutting device 264 and a positioning device 266.

In operation, the blister card 50 may be positioned on the table 250 to accurately identify the second perforation location 76 and the alignment device 252 may be employed to accurately determine the centerline of the blister card 50 (e.g., the centerline perforation 72) along with the first perforation location 74. The first and second perforation locations 74 and 76 may then be communicated to the processor 200, which may control the blister card cutter 180 to cut along each perforation 70 and finally also cut along the centerline perforation 72. In this regard, the blister card cutter 180 may employ the positioning device 266 to grip the blister card 50 and position the blister card 50 relative to the first cutting device 260 to initiate an initial cut along the perforation 70 at the first perforation location 74. The card holder 262 may be employed to hold the blister card 50 in place during the cutting along the perforation 70 so that the as yet uncut portion of the blister card 50 is held in place while the positioning device 266 proceeds to operate on the unit dose blisters that have been separated from the blister card 50 by the cutting of the first cutting device 260. As can be appreciated from FIG. 2, the first cutting device 260 may make a cut along a direction that is substantially perpendicular to the longitudinal axis of the blister card 50, which leaves two unit dose blisters being gripped by the positioning device 266, where the two unit dose blisters are separated by the centerline perforation 72.

The positioning device 266 may then advance the two unit dose blisters to contact the second cutting device 264, which may be positioned to cut along a direction substantially parallel to the longitudinal axis of the blister card 50 in order to cut along the centerline perforation 72. After cutting along the centerline perforation 72, the two unit dose blisters may be separated into two singulated unit dose blisters 60. In an exemplary embodiment, the positioning device 266 may be configured to then grip the remainder of the blister card 50 and, subsequent to a release of the card holder 262, advance the remainder of the blister card 50 such that the next perforation 70 is enabled to be cut by the first cutting device 260 in the same manner described above. In some cases, the next perforation may be detected using some type of perforation detection means. However, in an exemplary embodiment, the processor 200 may determine the location of each perforation 70 based on a distance between the first perforation location 74 and the second perforation location 76. In this regard, for example, the processor 200 may receive information (e.g., via the user input interface 240) regarding the configuration of the blister card 50. As such, the processor 200 may be made aware of the number of perforations 70 that lie perpendicular to the longitudinal axis of the blister card 50 (e.g., four perforations for a 2×5 blister card). Knowing that a total of four perforations are positioned equidistant from each other, the processor 200 may be enabled to determine the locations of each intermediate perforation (e.g., by dividing the distance between the first perforation location 74 and the second perforation location 76 by three in this example). Thus, the processor 200 may be configured to determine the distance from one cut made by the first cutting device 260 to the next in order to accurately cut the blister card 50 along each perforation that lies perpendicular to the longitudinal axis of the blister card 50.

FIG. 7, which includes FIGS. 7A, 7B and 7C, shows operation of the perforation determiner 170 according to an exemplary embodiment. FIG. 7A shows a top view of the table 250 according to an example embodiment. In this regard, the table 250 may include a feed end 300 at which end the positioning device 266 may approach the blister card 50 to grip the blister card 50 for positioning relative to the first cutting device 260. The table 250 may also include a reference end 302 which may be used for alignment with the second perforation location 76 to assist in determining the location of the perforations 70. In some embodiments, the first edge 82 of the blister card 50 may extend over the feed end 300 of the table 250 in order to enable the positioning device 266 to grip the blister card 50 as the blister card 50 rests on the table 250. However, in some embodiments, a notch 304 may be removed from the table 250 to provide an unobstructed avenue of approach for protrusions or fingers of the positioning device 266 to grip the blister card 50.

FIG. 7B shows the table 250 with the blister card 50 initially positioned thereon. As shown in FIG. 7B, the second perforation location 76 is aligned with the reference end 302 and the first edge 82 of the blister card 50 extends over the feed end 300 of the table 250. However, it should be noted that in some cases, the blister card 50 may not extend over the feed end 300 and, in fact, the blister card 50 may in some cases be cut while the perforation being cut is still positioned over a portion of the table 250. In some cases, alignment of the second perforation location 76 with the reference end 302 may be accomplished by folding the unit dose blisters not supported by the table 250 down as shown by arrow 268.

FIG. 7C shows the blister card 50 ready for perforation location determination. In this regard, unit dose blisters not supported by the table 250 have been folded down so that a second perforation location 76 is aligned with the reference end 302, thereby giving a fixed reference location for the position of the second perforation location 76. The alignment device 252 (e.g., including a laser) may be used to align a laser crosshair 270 with both the centerline perforation 72 and the perforation corresponding to the first perforation location 74. Notably, although a laser crosshair 270 is referred to as an example of a tool that may be employed by the alignment device 252, other mechanisms could be used such as, for example, a dot, an arrow, a pointer, or other optical pointing or alignment mechanism that may take any shape or form. In some cases, the laser crosshair 270 may be projected to a fixed location and the table 250 may be moveable in measurable increments such that the distance between the fixed location of the projection of the laser crosshair 270 and the reference end 302 may be determined when a ready signal (e.g., issued responsive to an operator pushing a button when the alignments are complete) is received. In some cases, a linear variable differential transformer may be employed to measure the distance of the table 250 from a particular baseline position after the table 250 is moved to align the blister card 50 appropriately (e.g., via the laser crosshair 270). When the alignment device 252 aligns the laser crosshair 270 appropriately, a fixed position for the first perforation location 74 is set. Thus, the alignment device 252 (or the processor 200) may be configured to determine the distance between the first perforation location 74 and the second perforation location 76 based on the distance between a center of the laser crosshair 270 and the reference end 302. Accordingly, knowing the distance between the first perforation location 74 and the second perforation location 76 and also knowing the number of cuts to be made (as described above), the processor 200 may determine the location of each intermediate perforation to direct cutting of the first cutting device 260 to cut at each respective location of the perforations. Also, having the location of the centerline perforation 72 identified, the processor 200 may direct cutting of the second cutting device 264 to cut at the location of the centerline perforation 72.

In an exemplary embodiment, an operator may position the blister card 50 manually onto the table 250 and align the second perforation location 76 with the reference end 302 (e.g., by bending the blister card 50 along the perforation 70 at the second perforation location 76). The operator may also utilize the alignment device 252 to manually align the laser crosshair 270 with the first perforation location 74 and the centerline perforation 72. However, in some embodiments, a robot may be configured to place the blister card 50 on the table 250 as described above. In this regard, for example, the robot may be in communication with the alignment device 252 to enable repeated feedback signals to be applied to enable the robot to align the laser crosshair 270 with the first perforation location 74 and the centerline perforation 72 after positioning the second perforation location 76 in alignment with the reference end 302. Furthermore, in some embodiments, a card magazine may be employed to dispense blister cards automatically onto the table 250. In such embodiments, a robot, as described above, may be employed to position dispensed blister cards on the table 250 in a manner that permits automated determination of perforation locations and unit dose blister singulation. However, in some alternative embodiments, the robot may include or otherwise be in communication with sensors or vision system components configured to locate perforations.

FIG. 8 illustrates a side view of operation of some components of the blister singulator 160 according to an exemplary embodiment. In this regard, FIG. 8 shows the table 250 being moveable in connection with operation of the alignment device 252 (see FIG. 6) to enable alignment of the laser crosshair 270 (not shown in FIG. 8) with the first perforation location 74 and the centerline perforation 72. The table 250 is shown twice in FIG. 8 to illustrate two positions that may be employed in connection with the table including a load position (labeled accordingly) and a ready position (also labeled accordingly). When the table 250 is in the load position, the blister card 250 is positioned on the table 250 with the second perforation location 76 being aligned with the reference end 302 by bending the last set of unit dose blisters down along a side of the table 250. The alignment device 252 is then employed to align the laser crosshair 270 as described above, thereby moving the table 250 to the ready position.

When the table 250 is moved to the ready position, the blister card 50 may be positioned appropriately to enable a determination of the distance between the first perforation location 74 and the second perforation 76 (and with knowledge of the total number of perforations on the blister card, also the position of every other perforation). The positioning device 266 may then be enabled to move the blister card 50 from its location at the ready position into a position that aligns the perforation to be cut with a cutting blade of the first cutting device 260. As such, the positioning device 266, which may be moveable in the x-direction, may advance to the table 250 in order to grip the blister card 50 to move the blister card into position for cutting. Gripping of the blister card 50 may be accomplished by the separation of opposing fingers 312 of the positioning device 266 followed by the clamping of the fingers 312 onto the top and bottom sides of the blister card 50 simultaneously. In other words, the fingers 312 may be enabled to move opposite to each other in the y-direction to permit the fingers to clamp onto or otherwise grip the blister card 50. In some embodiments, however, only one of the fingers (or one set of fingers) may be enabled to move while the other finger(s) remain stationary. Furthermore, in some cases, the fingers may be positioned to clamp on opposite sides of the centerline perforation 72, but leave the centerline perforation 72 itself unobstructed in order to enable cutting of the centerline perforation 72 by the second cutting device 264 without interference from the fingers 312.

After the blister card 50 has been gripped by the positioning device 266, the positioning device 266 may move the blister card 50 along the table 250 (or along another surface forming a base for the guillotine blade) until the perforation to be cut is aligned with the position of the guillotine blade when the guillotine blade is fully lowered to execute a cutting operation. As such, the guillotine blade may be configured to cut along a direction substantially perpendicular to the x-direction, which is also perpendicular to the longitudinal length of the blister card 50 as the blister card 50 travels through the blister singulator 160. In an exemplary embodiment, the positioning device 266 may be configured to pull the blister card 50 a predetermined distance from where the laser crosshair 270 was aligned with the first perforation location 74, to a known position of the guillotine blade when the guillotine blade is lowered to cut for the first cut on any particular blister card.

Prior to cutting of the blister card 50 by the first cutting device 260, the card holder 262 may clamp the blister card 50 to the table 250. As such, the card holder 262 may be enabled to move up and down in order to release (e.g., in the up position) or engage and clamp (e.g., in the down position) the blister card 50 to hold the blister card 50 during cutting by the first cutting device 260. By clamping the blister card 50, the card holder 262 may prevent movement of the blister card 50 when the guillotine blade performs the cut. Thus, when a cut is completed, the positioning device 266 may secure the cut stock that has been separated from the blister card 50 by the cut, while the card holder 262 may secure the remainder of the blister card 50. By securing the remainder of the blister card 50, the card holder 262 may also facilitate gripping of the remainder of the blister card 50, when the positioning device 266 returns after completing singulation of unit dose blisters of the cut stock as described below, to advance the next perforation into cutting position for repeated cutting operations. In some cases, to facilitate engagement of the fingers 312 with a clamped blister card that was previously cut, the card holder 262 may have a notch (e.g., similar to notch 304) to enable the fingers 312 to protrude through the card holder 262 even when the card holder 262 is extended to clamp a blister card.

After the first cutting operation, the positioning device 266 may be left holding cut stock comprising at least a pair of unit dose blisters that have been removed from the remainder of the blister card 50. The cut stock may then be moved along the x-direction through the second cutting device 264 to enable the second cutting device 264 to cut along the centerline perforation 72 to separate the cut stock into two singulated unit dose blisters 310. The singulated unit dose blisters 310 may then fall into a chute 320 angled to let gravity take the singulated unit dose blisters 310 away from the blister singulator 160. Alternatively, the singulated unit dose blisters 310 may be provided to a conveyor or some other output device. In some embodiments, the singulated unit dose blisters 310 may be provided to or otherwise loaded (automatically or manually) into the storage, retrieval and delivery system of FIGS. 3-5. In an exemplary embodiment, the singulated unit dose blisters 310 may be loaded into an intermediate storage tray and the storage tray itself may subsequently be loaded or otherwise provided (again automatically or manually) to the storage, retrieval and delivery system of FIGS. 3-5. As yet another alternative, the singulated unit dose blisters 310 may be loaded into bags, receptacles or other containers for bulk storage, shipment, transportation or other processing. In some cases, rather than simply having one blade associated with the second cutting device 264, multiple blades may be included to enable cutting of blister cards that have more than two unit dose blisters in each horizontal row relative to the centerline of the blister card. In these instances, an additional alignment may be accomplished to align each of the multiple blades with a corresponding perforation extending parallel to the centerline.

In an example embodiment, the second cutting device 264 may be a rotary blade (e.g., having a sharpened surface extending over the circumference of a circular blade mounted to rotate around a shaft) configured to cut in a direction substantially parallel to the longitudinal length of the blister card 50 (e.g., parallel to the x-direction). Moreover, the second cutting device 264 may be aligned such that when the laser crosshair 270 is aligned with the centerline perforation 72, the second cutting device 264 cuts along the centerline perforation 264 when the cut stock is moved past the position of the second cutting device 264. As such, the position of the second cutting device 264 may be fixed and the motion of the cut stock (as provided by the positioning device 266) may provide for the cutting action of the second cutting device 264.

Accordingly, based on the description above, the positioning device 266 may be configured to move through a series of positions during operation of the blister singulator 160. The two extreme limits to the movement of the positioning device 266 according to an example embodiment are shown in FIG. 8. In this regard, positioning device 266' is shown at the one extreme at which the positioning device 266 may initially engage the blister card 50 (or a remainder portion of a blister card). The positioning device 266 may then pull the blister card 50 into position to be cut by the guillotine blade at which point the positioning device 266 will be left holding cut stock after operation of the first cutting device 260. The cut stock may then be pulled through the second cutting device 264 until the positioning device 266" is shown at the opposite extreme prior to returning to grip another blister card (or remainder portion of a blister card).

FIG. 9 illustrates a block diagram showing operations associated with operation of one example embodiment of the blister singulator 160. In this regard, FIG. 9 specifically relates to an embodiment in which the blister singulator 160 is set up for operation by manual user placement of the blister card 50 onto the table 250. As shown in FIG. 9, an operator may initially place a blister card on the table at operation 400. At operation 402, the blister card may be folded to align the last perforation with the reference edge of the table. The operator may then align the centerline of the blister card (e.g., via the laser crosshair 270), which may involve movement of the blister card and/or movement of the table at operation 404. At operation 406, the first perforation to be cut may be registered to a known location (e.g., using the laser crosshair 270 or some other mechanism). In some cases, operations 404 and 406 may be combined. At operation 408, the positioning device may be activated to grip the blister card. In some embodiments, once operation 408 is complete, the operator may initiate automatic operation by operating a lever, door, button or some other device to initiate the take over of automatic operation of the blister singulator 160. The blister card may then be positioned for guillotine cutting at operation 410 via the positioning device advancing the blister card under the guillotine blade. The card holder may then clamp the blister card at operation 412 to enable cutting of the blister card along the first perforation at operation 414. At operation 416, the guillotine blade may be retracted, while continuing to clamp the remainder of the blister card. The positioning device, now holding cut stock, may advance the cut stock to the second cutting device to separate the cut stock into two singulated unit dose blisters at operation 418. The positioning device may then release the two singulated unit dose blisters at operation 420 (e.g., to a conveyor or chute). At operation 420, the positioning device may advance to grip the remainder of the blister card, after which time the card holder may release the remainder of the blister card. The remainder of the blister card may then be advanced under the guillotine blade by repeating operation 410 and the cycle may repeat until all unit dose blisters of the blister card have been singulated.

FIG. 10 is a flowchart of a method and program product according to exemplary embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device and executed by a processor (e.g., processor 200). As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

In this regard, a method of singulating unit dose blisters from a blister card including at least two perforations separating unit dose blisters positioned adjacent to each other and extending along a longitudinal length of the blister card according to one embodiment of the invention is shown in FIG. 10. The method may include receiving information indicative of a distance between a first perforation location and a second perforation location of the blister card for perforations extending along a direction substantially perpendicular to the longitudinal length of the blister card and separating unit dose blisters to be singulated at operation 500. The method may further include utilizing the received information to determine cutting locations for cutting at the first perforation location, the second perforation location and additional perforation locations at operation 510, and enabling cutting of each perforation extending substantially perpendicular to the longitudinal length of the blister card responsive to sequential cutting and repositioning operations based on determined cutting locations at operation 520.

In some embodiments, optional operations may be provided in addition to the operations described above. It should be appreciated that each of the optional operations described below may be included with the operations above either alone or in combination with any others among the features described herein. Accordingly, in some embodiments, the method may further include receiving information indicative of a total number of perforations extending substantially perpendicular to the longitudinal length of the blister card at operation 505. In such examples, utilizing the received information may include utilizing the received information indicative of the distance and the total number of perforations to determine the cutting locations. The method may also or additionally include enabling cutting of a perforation extending along the longitudinal length of the blister card at operation 525.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. An apparatus for singulating unit dose blisters from a blister card including at least two perforations separating unit dose blisters positioned adjacent to each other and extending along a longitudinal length of the blister card, the apparatus comprising:

a table with a reference end;

a visual indicator;

wherein the table and the visual indicator are movable with respect to one another, such that the visual indicator is aligned with the first perforation location and the reference end of the table is aligned with the second perforation location;

a perforation determiner that generates information indicative of a distance between the first perforation location and the second perforation locations as well as the locations of the perforations along the blister pack based on a number of total number blister packs and the relative position of the first perforation located under the visual indicator and the second perforation being aligned with the reference end of the table;

a blister card cutter configured to utilize the received information indicative of the distance to determine cutting locations for cutting at the first perforation location, the second perforation location and additional perforation locations and to enable cutting of each perforation extending substantially perpendicular to the longitudinal length of the blister card responsive to sequential cutting and repositioning operations based on determined cutting locations.

2. The apparatus of claim 1, wherein the blister card cutter includes a blade configured to cut the perforations substantially perpendicular to the longitudinal length to separate unit dose blisters from the blister card.

3. The apparatus of claim 2, wherein the blister card cutter further comprises a second cutting device configured to cut along a perforation extending parallel to the longitudinal length of the blister card, the perforation extending parallel to the longitudinal length of the blister card separating a pair of unit dose blisters such that cutting along the perforation extending parallel to the longitudinal length of the blister card singulates the unit dose blisters, the unit dose blisters being positioned to define at least two rows of unit dose blisters having at least one unit dose blister positioned on each side of the perforation extending parallel to the longitudinal length of the blister card of the blister card.

4. The apparatus of claim 3, wherein the second cutting device comprises a rotary blade.

5. The apparatus of claim 3, further comprising a positioning device configured to grip a portion of the blister card to position the blister card for cutting via the blade and thereafter position the pair of unit dose blisters for cutting by the second cutting device.

6. The apparatus of claim 5, further comprising a card holder disposed proximate to the blade to hold remaining portions of the blister card during and after cutting operations of the blade.

7. The apparatus of claim 1, wherein the table of the perforation determiner comprises a moveable table configured to enable alignment of the blister card such that the first perforation location is aligned with the reference end of the moveable table, and the second perforation location and a perforation extending parallel to the longitudinal length of the blister card are aligned with a visual indicator.

8. The apparatus of claim 7, wherein a distance between the first perforation location and the second perforation location is determined based on a distance between the one end of the moveable table and a position of the visual indicator.

9. The apparatus of claim 1, wherein the perforation determiner comprises a moveable table including a linear variable differential transformer configured to measure a distance of the moveable table from a particular baseline position responsive to positioning of the blister card on the moveable table.

10. The apparatus of claim 1, further comprising a positioning device including fingers selectively positionable on opposite sides of a portion of the blister card to enable the fingers to grip the blister card to position the blister card for the sequential cutting and repositioning operations.

11. The apparatus of claim 10, wherein the positioning device includes at least two fingers positionable on opposite sides of a perforation extending parallel to the longitudinal length of the blister card of a face of the blister card to enable a cutting device to cut along the perforation extending parallel to the longitudinal length of the blister card while the blister card is being gripped by the positioning device to singulate unit dose blisters.

12. The apparatus of claim 10, wherein the positioning device is configured to enable motion parallel to the longitudinal length of the blister card and the positioning device includes fingers configured to enable motion of the fingers in directions perpendicular to the longitudinal length of the blister card for gripping of the blister card.

13. The apparatus of claim 10, wherein the positioning device is configured to release singulated unit dose blisters into a chute.

14. The apparatus of claim 1, wherein the apparatus is operably connected to a dispensing robot configured to enable automatic dispensing of unit dose blisters singulated by the apparatus.

15. An apparatus for singulating unit dose blisters from a blister card including at least two perforations separating unit dose blisters positioned adjacent to each other and extending along a longitudinal length of the blister card, the apparatus comprising:

a movable table comprising a reference end, wherein a first perforation is aligned with the reference end of the table;

a visual indicator that is adjustable and configured to be aligned with a second perforation;

a processor configured to generate information indicative of a distance between the first perforation at the movable table reference end and the second perforation at the visual indicator, wherein the processor is further configured to determine cutting locations for cutting at the first perforation location, the second perforation location, and additional perforation locations; and a blister card cutter configured to use the cutting locations and to enable cutting of each perforation extending substantially perpendicular to the longitudinal length of the blister card responsive to sequential cutting and repositioning operations based on determined cutting locations.

16. The apparatus of claim 15, wherein at least one of the additional perforation locations is disposed between the first perforation location and the second perforation location.

17. The apparatus of claim 15, wherein the information indicative of the distance between the first perforation and the second perforation is determined based on a distance between the reference end of the table and a position of the visual indicator.

18. The apparatus of claim 15, wherein the table comprises a moveable table including a linear variable differential transformer configured to measure a distance of the moveable table from a particular baseline position responsive to positioning of the blister card on the moveable table.

19. The apparatus of claim 15, wherein the processor is configured to generate information indicative of the distance between the first perforation and the second perforation when the first perforation is aligned with the reference end of the table and the visual indicator is aligned with the second perforation.

* * * * *